US012807192B2

(12) United States Patent
Kim et al.

(10) Patent No.: US 12,807,192 B2
(45) Date of Patent: Nov. 24, 2026

(54) APPARATUS FOR CONTROLLING AUTOMATIC DRIVING OF VEHICLE AND METHOD FOR DETERMINING STATE OF A DRIVER

(71) Applicants: Hyundai Motor Company, Seoul (KR); Kia Corporation, Seoul (KR)

(72) Inventors: Dong Hyuk Kim, Hanam-si (KR); Hyuk Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 141 days.

(21) Appl. No.: 18/385,594

(22) Filed: Oct. 31, 2023

(65) Prior Publication Data

US 2024/0425086 A1 Dec. 26, 2024

(30) Foreign Application Priority Data

Jun. 20, 2023 (KR) ........................ 10-2023-0079181

(51) Int. Cl.

| | |
|---|---|
| ***B60W 60/00*** | (2020.01) |
| ***B60W 50/08*** | (2020.01) |
| ***B60W 50/14*** | (2020.01) |
| ***G06V 20/59*** | (2022.01) |
| ***H04M 1/72409*** | (2021.01) |

(52) U.S. Cl.

CPC ........ *B60W 60/005* (2020.02); *B60W 50/082* (2013.01); *B60W 50/14* (2013.01); *G06V 20/597* (2022.01); *H04M 1/72409* (2021.01); *B60W 2050/146* (2013.01); *B60W 2540/229* (2020.02)

(58) Field of Classification Search

CPC .. B60W 60/005; B60W 50/082; B60W 50/14; B60W 2540/229; B60W 2050/146; H04M 1/72409; G06V 20/597

USPC ............................................................ 701/23

See application file for complete search history.

(56) References Cited

U.S. PATENT DOCUMENTS

| | | | | |
|---|---|---|---|---|
| 9,342,074 | B2 * | 5/2016 | Dolgov ............. | B60W 60/0053 |
| 2016/0209840 | A1 * | 7/2016 | Kim .................. | B60W 60/0059 |
| 2017/0110022 | A1 * | 4/2017 | Gulash ..................... | G09B 5/06 |

(Continued)

FOREIGN PATENT DOCUMENTS

| | | |
|---|---|---|
| KR | 101844243 B1 | 5/2018 |
| KR | 10-2024-0092689 A | 6/2024 |

(Continued)

*Primary Examiner* — Tuan C To

(74) *Attorney, Agent, or Firm* — Banner & Witcoff, Ltd.

(57) ABSTRACT

The present disclosure relates to an autonomous driving control apparatus and a driver state determining method thereof. An example of the present disclosure provides an autonomous driving control apparatus including: a processor, memory storing instructions, when executed by the processor, may cause the apparatus to communicate with a mobile device during driving of the vehicle in an autonomous driving mode, determine, based on the communication with the mobile device, whether a driver state is an available state for a manual driving mode, and based on the determination, may cause the vehicle to remain in the autonomous driving mode or may cause the mobile device to send a transition demand (TD) to switch the driving mode of the vehicle from the autonomous driving mode to the manual driving mode.

20 Claims, 8 Drawing Sheets

(56) References Cited

U.S. PATENT DOCUMENTS

| | | | | | |
|---|---|---|---|---|---|
| 2017/0364070 | A1* | 12/2017 | Oba | ...................... | B60W 50/08 |
| 2018/0150074 | A1* | 5/2018 | Hashimoto | ....... | B60W 60/0053 |
| 2019/0056732 | A1* | 2/2019 | Aoi | ........................ | G08B 21/06 |
| 2019/0155279 | A1* | 5/2019 | Tayama | ................ | B60W 30/00 |
| 2023/0054024 | A1* | 2/2023 | Oba | ..................... | A61B 5/7282 |
| 2024/0199089 | A1 | 6/2024 | Kim | | |
| 2024/0300544 | A1* | 9/2024 | Fujino | ................... | B60W 50/14 |

FOREIGN PATENT DOCUMENTS

| | | | | | |
|---|---|---|---|---|---|
| WO | WO-2016092796 | A1 * | 6/2016 | ............ | B60W 50/14 |
| WO | WO-2020181420 | A1 * | 9/2020 | ............. | B60K 35/00 |

* cited by examiner

APPARATUS FOR CONTROLLING AUTOMATIC DRIVING OF VEHICLE AND METHOD FOR DETERMINING STATE OF A DRIVER

CROSS-REFERENCE TO RELATED APPLICATION

This application claims priority to and the benefit of Korean Patent Application No. 10-2023-0079181, filed in the Korean Intellectual Property Office on Jun. 20, 2023, the entire contents of which are incorporated herein by reference.

TECHNICAL FIELD

The present disclosure relates to an autonomous driving control apparatus and a driver state determining method thereof, and more particularly, to a technique for accurately determining a state of a driver using a mobile device during autonomous driving.

BACKGROUND

As an electronic technique of a vehicle develops, an interest in an autonomous vehicle that drives to a destination by recognizing a driving environment of the vehicle itself without manipulation of a driver is growing more and more.

The autonomous vehicle indicates a vehicle that controls itself by recognizing a surrounding environment using various types of sensors (e.g., a lidar, a camera, a radar, an ultrasonic sensor, etc.) and a vehicle to everything (V2X) and determining a driving situation without driver intervention based on position information and road information of a global positioning system (GPS).

During conditional autonomous driving, accuracy may be low because a state of the driver (e.g., a drowsy state, careless looking ahead, etc.) may be determined using only in-vehicle camera information. In particular, in response to a case where the driver is looking at a smartphone, the driver may be mistakenly determined to be in a drowsy state according to a gaze angle of the driver with respect to the smartphone.

SUMMARY

According to the present disclosure, an apparatus for controlling a driving mode of a vehicle, the apparatus may comprise: a processor; memory storing instructions, when executed by the processor, may cause the apparatus to communicate with a mobile device during driving of the vehicle in an autonomous driving mode; determine, based on the communication with the mobile device, whether a driver state is an available state for a manual driving mode; and based on the determination, may cause the vehicle to remain in the autonomous driving mode or may cause the mobile device to send a transition demand (TD) to switch the driving mode of the vehicle from the autonomous driving mode to the manual driving mode.

The apparatus, wherein the instructions, when executed by the processor, further may cause the apparatus to determine the driver state at a conditional autonomous driving level among a plurality of autonomous driving levels.

The apparatus, wherein the instructions, when executed by the processor, further may cause the apparatus to determine the driver state by using an information sensor inside the vehicle and the mobile device.

The apparatus, wherein the instructions, when executed by the processor, further may cause the apparatus to determine, based on a determination by the information sensor inside the vehicle that the driver state is not the available state, whether the mobile device is in a communication-connected state to the vehicle.

The apparatus, wherein the instructions, when executed by the processor, further may cause the apparatus to determine, based on a determination that the mobile device is in the communication-connected state to the vehicle, whether the mobile device is a mobile device owned, handled, or used by a driver of the vehicle.

The apparatus, wherein the instructions, when executed by the processor, further may cause the apparatus to determine, based on the mobile device being positioned proximate to a driver seat, that the mobile device is a mobile device owned, handled, or used by the driver.

The apparatus, wherein the instructions, when executed by the processor, further may cause the apparatus to determine, based on the mobile device being the mobile device owned, handled, or used by the driver, the driver state using the mobile device.

The apparatus, wherein the instructions, when executed by the processor, further may cause the apparatus to perform, based on a determination that the mobile device is communication-connected to the vehicle and the mobile device is not owned or not handled by a driver of the vehicle, or based on a determination that the mobile device is not communication-connected to the vehicle, a TD procedure for notifying the driver of the TD.

The apparatus, wherein the instructions, when executed by the processor, further may cause the apparatus to: output a TD notification message on an in-vehicle display; or notify the driver of the TD through the mobile device based on the performance of the TD procedure.

The apparatus, wherein the instructions, when executed by the processor, further may cause the apparatus to may cause, based on a determination that the driver state is the available state, the vehicle to operate in the manual driving mode.

The apparatus, wherein the instructions, when executed by the processor, further may cause the apparatus to determine that the driver state is an unavailable state in which the TD is not to be sent based on a determination that the mobile device is not positioned proximate to a driver seat or the mobile device is positioned in a passenger seat or a rear seat.

The apparatus, wherein the instructions, when executed by the processor, further may cause the apparatus to determine whether manipulation of the mobile device occurs at predetermined intervals; and based on a determination that the manipulation of the mobile device does not occur at the predetermined intervals, determine that the driver state is an unavailable state in which the TD is not to be sent.

The apparatus, wherein the instructions, when executed by the processor, further may cause the apparatus to determine whether pupils of a driver are detected via a front camera of the mobile device; and based on a determination that the pupils of the driver are not detected via the front camera of the mobile device, determine that the driver state is an unavailable state in which the TD is not to be sent.

The apparatus, wherein the instructions, when executed by the processor, further may cause the apparatus to output a touch notification through the mobile device; determine whether a touch manipulation of the mobile device is performed by a driver based on the touch notification; and based on a determination that the touch manipulation of the mobile device is not performed by the driver, determine that the driver state is an unavailable state in which the TD is not to be sent.

The apparatus, wherein the instructions, when executed by the processor, further may cause the apparatus to, based on a determination that the mobile device is positioned proximate to a driver seat: set automatic screen off mode for the mobile device; and determine, based on a screen of the mobile device automatically being turned off, that the driver state is an unavailable state in which the TD is not to be sent.

The apparatus, wherein the instructions, when executed by the processor, further may cause the apparatus to estimate a position of the mobile device using camera information of the mobile device and information from an in-vehicle information sensor; and determine, based on the estimated position, whether the mobile device is a mobile device owned, handled, or used by a driver.

According to the present disclosure, a method for controlling a driving mode of a vehicle, the method may comprise: communicating, by a processor, with a mobile device during driving of the vehicle in an autonomous driving mode; determining, by the processor, based on the communicating with the mobile device, whether a driver state is an available state for a manual driving mode; and based on the determining, causing the vehicle to remain in the autonomous driving mode or causing the mobile device to send a transition demand (TD) to switch the driving mode of the vehicle from the autonomous driving mode to the manual driving mode.

The method, wherein the determining whether the driver state is the available state may comprise determining, by the processor, the driver state at a conditional autonomous driving level among a plurality of autonomous driving levels.

The method, wherein the determining whether the driver state is the available state may comprise determining, by the processor using an information sensor inside the vehicle and the mobile device, the driver state.

The method, wherein the determining whether the driver state is the available state may comprise: determining, by the processor, whether manipulation of the mobile device occurs at predetermined intervals; and determining, by the processor and based on a determination that the manipulation of the mobile device does not occur at the predetermined intervals, that the driver state is an unavailable state in which the TD is not to be sent.

DETAILED DESCRIPTION

Figure 1:
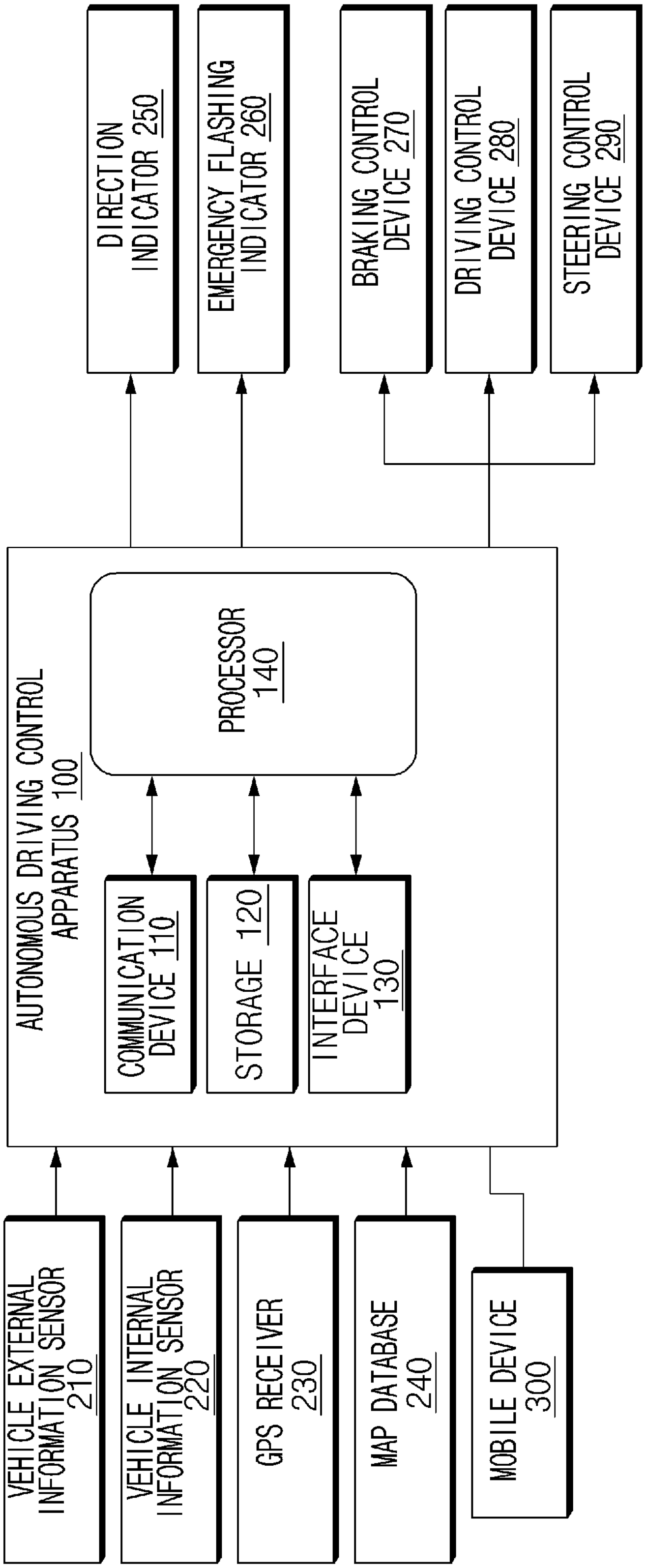
FIG. 1 shows an example configuration of a vehicle system including an autonomous driving control apparatus.

Hereinafter, some examples of the present disclosure will be described in detail with reference to example drawings. It should be noted that in adding reference numerals to constituent elements of each drawing, the same constituent elements have the same reference numerals as possible even though they are indicated on different drawings. In describing an example, if it is determined that a detailed description of the well-known configuration or function associated with the example may obscure the gist of the present disclosure, it will be omitted.

In describing constituent elements according to an example, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an example of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various examples of the present disclosure will be described in detail with reference to FIG. 1 to FIG. 7.

Autonomous driving levels are classified into a total of six levels, at level 0, an automation function is not applied, at level 1, driver assistance driving is performed, at level 2, partial autonomous driving is performed, and at level 3, conditional autonomous driving is performed. At level 4, high level autonomous driving is performed, and at level 5, full autonomous driving is performed.

The present disclosure discloses a configuration for determining driver availability during conditional autonomous driving.

FIG. 1 shows an example configuration of a vehicle system including an autonomous driving control apparatus.

Referring to FIG. 1, the vehicle system according to an example of the present disclosure may include an autonomous driving control apparatus 100, a vehicle external information sensor 210, a vehicle internal information sensor 220, a GPS receiver 230, a map database 240, a direction indicator 250, an emergency flashing indicator 260, a braking control device 270, a driving control device 280, and a steering control device 290.

According to an example of the present disclosure, the autonomous driving control apparatus 100 may be implemented within or separately from a vehicle. In this case, the autonomous driving control apparatus 100 may be integrally formed with internal control units of the vehicle, or may be implemented as a separate hardware device to be connected to control units of the vehicle by a connection means. For example, the autonomous driving control apparatus 100 may be implemented integrally with the vehicle, may be implemented in a form that is installed or attached to the vehicle as a configuration separate from the vehicle, or a part thereof may be implemented integrally with the vehicle, and another part may be implemented in a form that is installed or attached to the vehicle as a configuration separate from the vehicle.

The autonomous driving control apparatus 100 may include an advanced driver assistance system (ADAS), an automated lane keeping system (ALKS), a forward collision-avoidance assist (FCA) system, a lane keeping assist (LKA) system, a blind-spot collision-avoidance Assist (BCA) system, and a smart cruise control (SCC) system.

The autonomous driving control apparatus 100 should be able to detect whether a driver is in an appropriate driving position and whether the driver is available in order to respond to a transition demand (TD) through monitoring of the driver. The appropriate driving position of the driver means a posture in which the driver is seated in a chair and in which a back of the driver is not lying down. In addition or alternative, the state of the driver with availability indicates a state in which the driver can receive the TD at any time, and the state of the driver with unavailability indicates a state in which the driver cannot receive the TD (e.g., forward gaze negligence, drowsiness, etc.).

According to the law, a vehicle manufacturer may prove driver availability detection performance of the vehicle to receive the TD to the certification institution.

The autonomous driving control apparatus 100 may determine whether following conditions are satisfied in order to determine whether the driver is in an available state.

1) If the driver does not generate a positive signal indicating that the driver is in the available state by at least two driver availability factors (e.g., driver's gaze, driver's posture, driver's head nod, driver's eyes closed, etc.), the driver may be determined to be available.

2) At any time, the autonomous driving control apparatus 100 may determine that the driver is unavailable.

3) If it is determined that the driver is unavailable or if fewer than two driver availability factors are positive, the autonomous driving control apparatus 100 may determine that the driver is in the unavailable state and immediately generate a warning signal. The warning signal is generated until an appropriate action (action) by the driver is detected or the TD is started. The TD is issued in response to a case where the warning persists for 15 seconds.

The autonomous driving control apparatus 100 may use the mobile device 300 during autonomous driving to determine whether the driver is in a state in which the TD can be received.

The autonomous driving control apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition or alternative, the communication device 110 may perform communication with a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world Interoperability for microwave access (Wimax), etc. In addition or alternative, short-range communication technique may include bluetooth, ZigBee, ultra-wideband (UWB), radio frequency identification (RFID), infrared data association (IrDA), and the like.

The communication device 110 may perform V2X communication. The V2X communication may include communication between vehicle and all entities such as V2V (vehicle-to-vehicle) communication which refers to communication between vehicles, V2I (vehicle to infrastructure) communication which refers to communication between a vehicle and an eNB or road side unit (RSU), V2P (vehicle-to-pedestrian) communication, which refers to communication between user equipment (UE) held by vehicles and individuals (pedestrians, cyclists, vehicle drivers, or occupants), and V2N (vehicle-to-network) communication.

In addition or alternative, the communication device 110 may share information for checking the driver state by performing Bluetooth or ultra-wideband (UWB) communication with the mobile device 300.

The storage 120 may store sensing results of the vehicle external information sensor 210 and the vehicle internal information sensor 220, position information received from the GPS receiver 230, map information received from the map database 240, and data and/or algorithms used for the processor 140 to operate.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), or a human machine interface (HM), a human machine interface (HMI).

The output device may include a display, and may also include a voice output means such as a speaker. In the instant case, in a response to a case that a touch sensor formed of a touch film, a touch sheet, or a touch pad is provided on the display, the display may operate as a touch screen, and may be implemented in a form in which an input device and an output device are integrated. In the present disclosure, the output device may output autonomous driving information. In this case, the autonomous driving information may include driver state determination information, autonomous driving state information, information related to remaining time until a transition demand (TD) occurs, and the like.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, may electrically control each component, and may be an electrical circuit that executes software commands, thereby performing various data processing and calculations described below.

The processor 140 may process a signal transferred between components of the autonomous driving control apparatus 100 to perform overall control such that each of the components can perform its function normally. The processor 140 may be implemented in the form of hardware, software, or a combination of hardware and software. For example, the processor 140 may be implemented as a microprocessor, but the present disclosure is not limited thereto. For example, it may be, e.g., an electronic control unit (ECU), a micro controller unit (MCU), or other sub-controllers mounted in the vehicle.

The processor 140 may use the mobile device 300 during autonomous driving to determine whether the driver is in a state in which the TD can be received.

The processor 140 may determine the driver state at a conditional autonomous driving level among the autonomous driving levels.

Figure 3A:
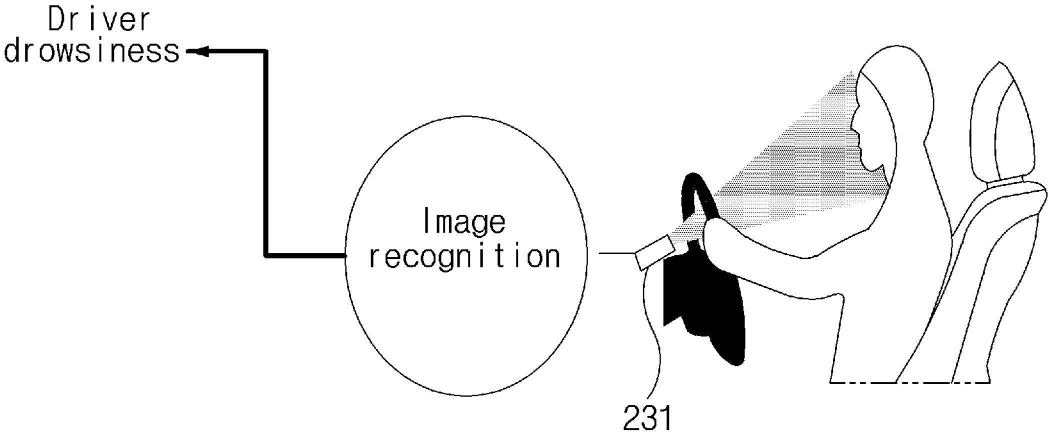
FIG. 3A shows an example of determining a state of a driver using a camera.
Figure 3B:
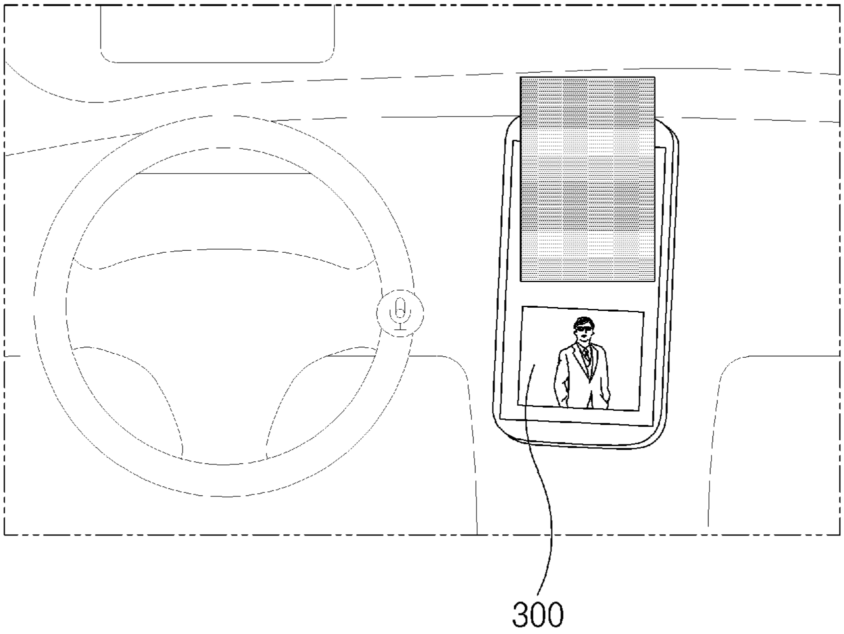
FIG. 3B shows an example of determining a state of a driver using a mobile device.

The processor 140 may determine the driver state by using an information sensor inside the vehicle and the mobile device 300, FIG. 3A shows an example of determining a state of a driver using a camera 231, and FIG. 3B shows an example of determining a state of a driver using the mobile device 300.

The processor 140 may determine whether the mobile device 300 is in a communication-connected state to the vehicle in response to a case where it is determined by the vehicle internal information sensor 220 that the driver is not in a state in which the TD can be received.

The processor 140 may determine whether the mobile device 300 is the mobile device 300 owned, handled, or used by the driver in response to a case where the mobile device 300 is in the communication-connected state with the vehicle.

The processor 140 may determine that the mobile device 300 belongs to the driver in response to a case where the mobile device 300 is positioned near a driver seat.

The processor 140 may determine the driver state by using the mobile device 300.

The processor 140 may perform a TD procedure for performing the TD in response to a case where the mobile device 300 is not connected to the vehicle or the mobile device 300 is owned, handled, or used by the driver.

The processor 140 may notify the driver of the TD by outputting a TD notification phrase on a display in the vehicle in response to a case where the TD procedure is performed, or may notify the driver of the TD through the mobile device 300.

The processor 140 may continue an autonomous driving mode in response to a case where the driver is determined to be in a state where the TD can be received.

The processor 140 may determine that the driver is in a state in which the TD cannot be received in response to a case where the mobile device 300 is not positioned around the driver seat and the mobile device 300 is positioned in a passenger seat or a rear seat.

The processor 140 may determine whether the mobile device 300 is positioned around the driver seat and manipulation of the mobile device 300 occurs at predetermined intervals.

The processor 140 may determine whether pupils of the driver are checked through a front camera of the mobile device 300 in response to a case where manipulation of the mobile device 300 does not occur at predetermined intervals.

The processor 140 outputs a touch notification through the mobile device 300 in response to a case where the pupils of the driver are not identified through the front camera of the mobile device 300, and may determine whether a touch manipulation of the mobile device 300 is performed by the driver in response to the touch notification.

The processor 140 may determine that the driver is in the state in which the TD cannot be received in response to a case where the touch manipulation of the mobile device 300 is not performed by the driver according to the touch notification.

The processor 140 may set a screen of the mobile device 300 to automatically turn off in response to a case where the mobile device 300 is positioned around the driver seat, and may determine that the driver is in the state in which the TD cannot be received in response to a case where the screen of the mobile device 300 automatically turns off.

The processor 140 may estimate a position of the mobile device 300 using camera information of the mobile device 300 and information of the information sensor 220 inside the vehicle, and may determine whether the mobile device 300 is the mobile device 300 owned, handled, or used by the driver.

The vehicle external information sensor 210 may include one or more sensors that sense an obstacle, e.g., a preceding vehicle, positioned around the host vehicle and measure a distance with the obstacle and/or a relative speed thereof.

The vehicle external information sensor 210 may include a plurality of sensors to sense an external object of the vehicle, to obtain information related to a position of the external object, a speed of the external object, a moving direction of the external object, and/or a type of the external object (e.g., vehicles, pedestrians, bicycles or motorcycles, etc.). To this end, the vehicle external information sensor 210 may include an ultrasonic sensor, a radar, an external camera, a laser scanner, and/or a corner radar, a lidar, an acceleration sensor, a yaw rate sensor, a torque measurement sensor and/or a wheel speed sensor, a steering angle sensor, etc.

The vehicle internal information sensor 220 may include a camera for photographing an interior of the vehicle and a user.

The GPS receiver 230 receives GPS signals from satellites to transmit them to the autonomous driving control apparatus 100. Accordingly, it is possible to grasp a position of a host vehicle of the autonomous driving control apparatus 100.

Although the map database 240 is illustrated as being included in a vehicle system, the autonomous driving control apparatus 100 may be positioned outside the vehicle to receive map information from the map database 240. In this case, the map data may include a precision map. The autonomous driving control apparatus 100

The direction indicator 250 is controlled by the autonomous driving control apparatus 100 to be turned on in response to rotating left or right.

The emergency flashing indicator 260 flashes in response to an emergency or for warning.

The braking control device 270 may be configured to control braking of the vehicle, and may include a controller that controls a brake thereof.

The driving control device 280 may be configured to control engine or motor driving of a vehicle, and may include a controller that controls a speed of the vehicle.

The steering control device 290 may be configured to control a steering angle of a vehicle, and may include a steering wheel, an actuator interlocked with the steering wheel, and a controller controlling the actuator.

In response to the case where there is no driver input such as driving/braking/steering during the operation of the autonomous driving control device 100, acceleration/deceleration control and steering control are performed according to a situation predetermined by the driver or determined by the autonomous driving control apparatus 100 as a general conditional autonomous driving situation.

The mobile device 300 may include a smart phone, a tablet personal computer (PC), a mobile phone, a video phone, an e-book reader, a netbook computer, a personal digital assistant (PDA), a portable multimedia player (PMP), a mobile communication terminal, an electronic notebook, and the like, and any device on which a navigation application can be installed.

Figure 2:
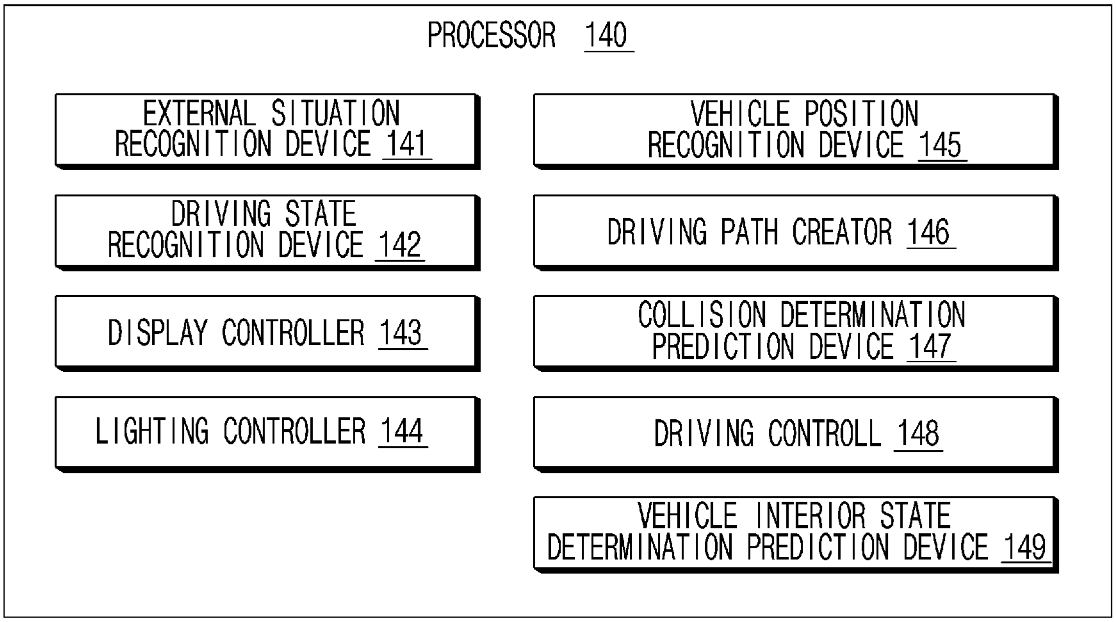
FIG. 2 shows an example processor.

FIG. 2 shows an example processor.

Referring to FIG. 2, the processor 140 may include an external situation recognition device 141, a driving state recognition device 142, a display controller 143, a lighting controller 144, a vehicle position recognition device 145, a driving path creator 146, a collision determination prediction device 147, a driving controller 148, and a vehicle interior state determination device 149.

The external situation recognition device 141 recognizes an external situation during autonomous driving based on sensing information of the vehicle external information sensor 210. In this case, the external situation may include an inter-vehicle distance to a front vehicle, speed of the front vehicle, cut-in vehicle information, and the like.

The driving state recognition device 142 recognizes a driving state of the vehicle. That is, the driving state may include states such as an autonomous driving mode and a manual driving mode.

The display controller 143 may control an operation of the interface device 130.

The lighting controller 144 may control a flashing operation of emergency flashing indicator 260.

The vehicle position recognition device 145 may determine a position of the vehicle based on GPS information of the GPS receiver 230.

The driving path creator 146 may create a path for autonomous driving or correct the created path.

The collision determination prediction device 147 may predict a collision with an external object (e.g., a preceding vehicle, etc.) around the vehicle. In addition or alternative, the collision determination prediction device 147 may calculate a possibility of collision for an area around the host vehicle on the current driving road as well as predicting the collision determination in a general autonomous driving situation.

The driving controller 148 may adjust an actuator output value by calculating the vehicle position and driving path predicted by the vehicle position recognition device 145 and determining a driver steering/braking/driving amount.

The vehicle interior state determination device 149 may determine the driver state using a vehicle interior information sensor 122 and the mobile device 300 to determine whether the driver state is available or not available, and may request the driver to receive the TD.

As such, according to the present disclosure, during conditional autonomous driving, the driver state is monitored so that the driver can respond immediately in response to the TD.

Figure 4:
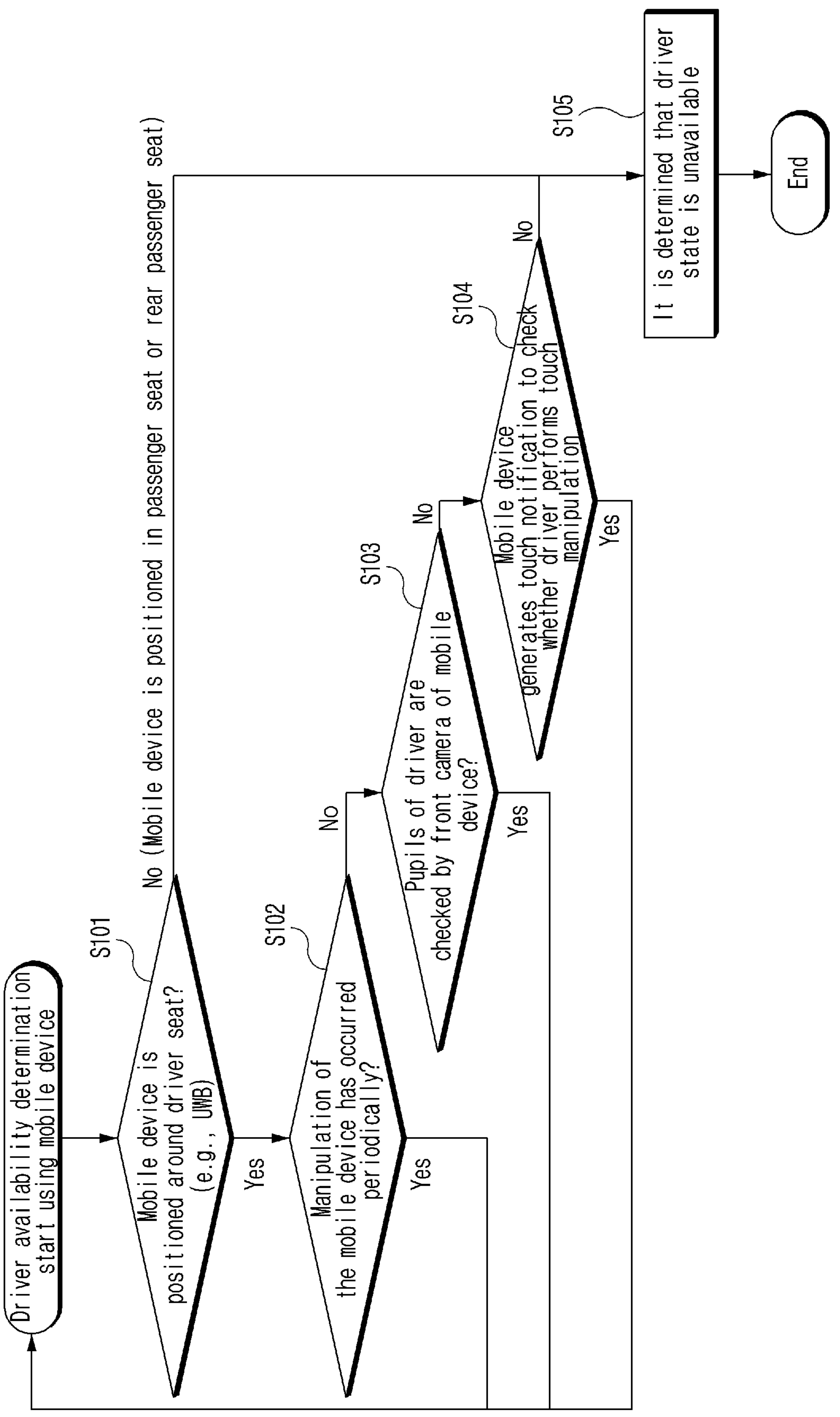
FIG. 4 shows an example method for determining a driver state using a camera of a mobile device of an autonomous driving control apparatus.
Figure 5:
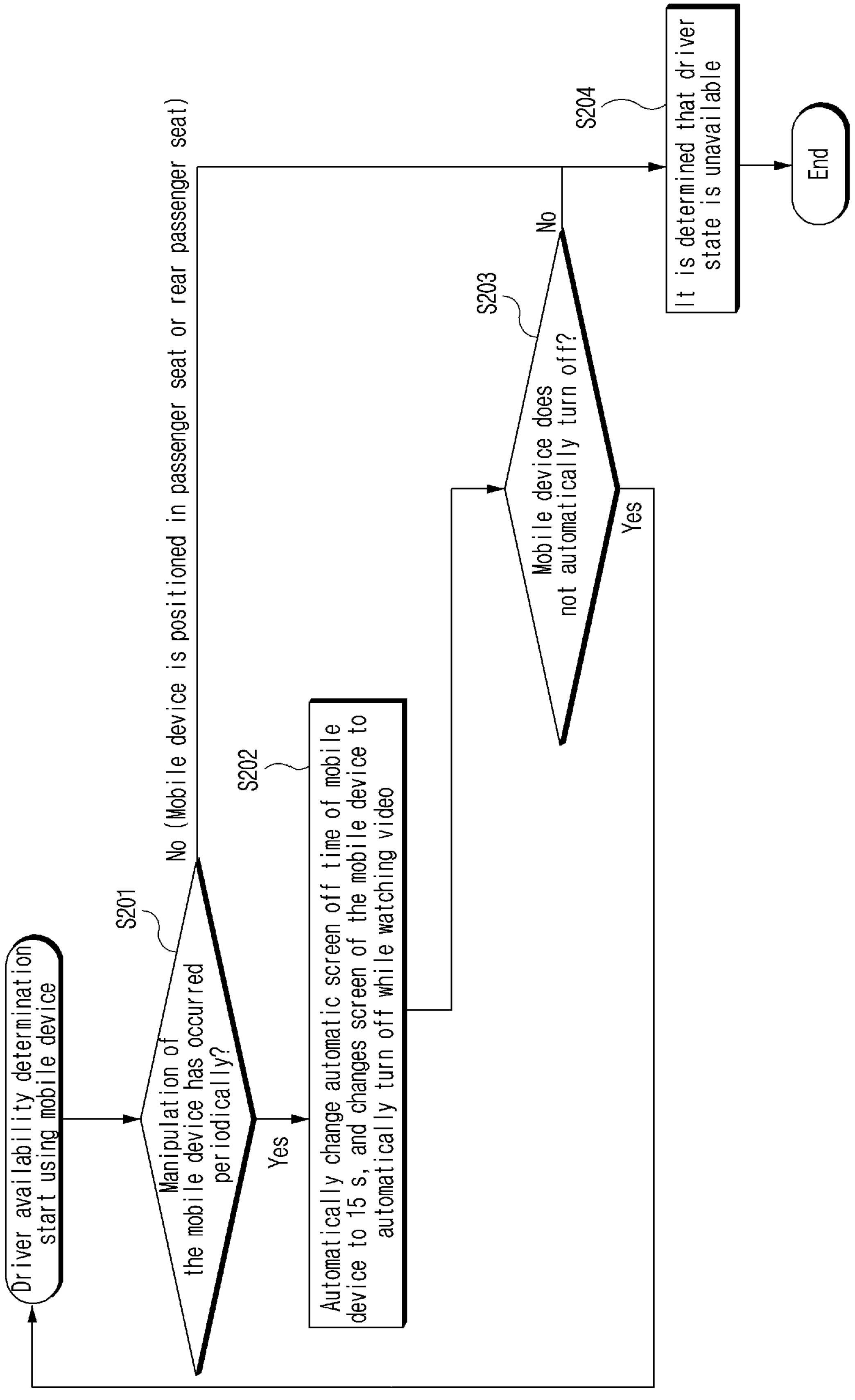
FIG. 5 shows an example method for determining a driver state by using an auto-off function of a mobile device of an autonomous driving control apparatus.
Figure 6:
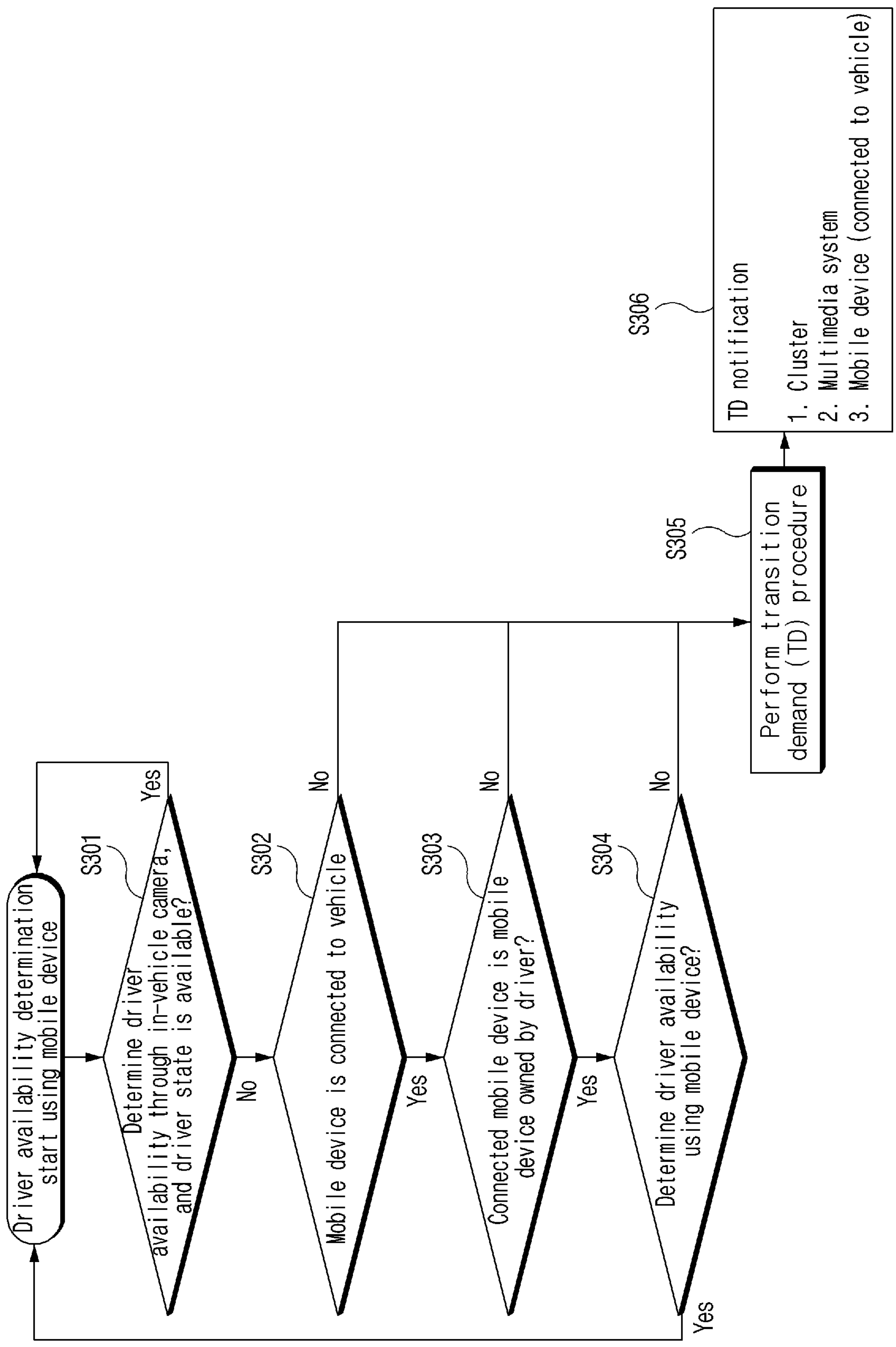
FIG. 6 shows an example driver state determining method using a mobile device during autonomous driving control.

Hereinafter, a driver state determining method of an autonomous driving control apparatus according to an example of the present disclosure will be described in detail with reference to FIG. 4 to FIG. 6. FIG. 4 shows an example method for determining a driver state using a camera of a mobile device of an autonomous driving control apparatus, FIG. 5 shows an example method for determining a driver state by using an auto-off function of a mobile device of an autonomous driving control apparatus, and FIG. 6 shows an example driver state determining method using a mobile device during autonomous driving control.

Hereinafter, it is assumed that the autonomous driving control apparatus 100 of FIG. 1 performs the processes of FIG. 4 to FIG. 6. In addition or alternative, in the description of FIG. 4 to FIG. 6, operations described as being performed by the device may be understood as being controlled by the processor 140 of the autonomous driving control apparatus 100.

Referring to FIG. 4, the autonomous driving control apparatus 100 determines whether the mobile device 300 is positioned around a driver seat in response to a case where driver availability determination starts (S101). In this case, the autonomous driving control apparatus 100 may perform Bluetooth or ultra-wideband (UWB) communication with the mobile device 300 to determine whether the mobile device 300 is positioned around the driver seat. In addition or alternative, the autonomous driving control apparatus 100 may determine whether the mobile device 300 is positioned around the driver seat by interlocking with an application (APP) installed in the mobile device 300. In addition or alternative, determining whether the mobile device 300 is positioned around the driver seat is to determine whether the mobile device 300 is the mobile device of the driver.

The driver is in a different position from the driver seat in response to a case where the mobile device 300 is not positioned around the driver seat, that is, a case where the mobile device 300 is positioned in a passenger seat or a rear passenger seat (rear seat), and thus it may be determined that the driver is in an unavailable state (S105).

On the other hand, if the mobile device 300 is positioned around the driver seat, the autonomous driving control apparatus 100 determines whether manipulation of the mobile device 300 has occurred periodically (S102). In this case, the autonomous driving control apparatus 100 may determine whether the mobile device 300 is manipulated through communication with the mobile device 300.

In response to a case where manipulation of the mobile device 300 occurs periodically in the above step S102, the autonomous driving control apparatus 100 determines that the driver state is available (S103) and returns to an initial step of determining availability. That is, in response to a case where manipulation of the mobile device 300 occurs periodically, the autonomous driving control apparatus 100 determines a state in which the TD can be received, which is a state in which the driver is manipulating the mobile device 300 in the driver seat, that is, a state in which there is availability.

Meanwhile, in order to check the driver state in more detail in response to a case where the manipulation of the mobile device 300 does not occur periodically, the autonomous driving control apparatus 100 determines whether pupils of the driver are checked by a front camera of the mobile device 300 (S103).

In response to a case where the pupils of the driver are checked by the front camera of the mobile device 300, the driver is using the mobile device 300 and is not drowsy or asleep, and thus the autonomous driving control apparatus 100 may determine that the driver state is available.

On the other hand, in response to a case where the pupils of the driver are not checked by the front camera of the mobile device 300, to determine the driver state such as closing eyes of the driver and to check the driver state in more detail, the mobile device 300 generates a touch notification to check whether the driver performs a touch manipulation (S104).

The autonomous driving control apparatus 100 determines that the driver state is unavailable in response to a case where no touch manipulation is performed for a touch notification of the mobile device 300 (S105). On the other hand, the autonomous driving control apparatus 100 determines that the driver is an available state in response to a case where the driver performs a touch manipulation for a touch notification of the mobile device 300.

As such, according to the present disclosure, it is possible to accurately determine whether the driver is in the available state by determining whether the mobile device 300 is positioned around the driver seat, and determining whether periodic manipulation of the mobile device 300 occurs, use of the front camera of the mobile device 300, whether or not a touch manipulation occurs through a touch notification of the mobile device 300, and the like.

Referring to FIG. 5, the autonomous driving control apparatus 100 determines whether the mobile device 300 is positioned around the driver seat (S201).

In response to a case where the mobile device 300 is positioned around the driver seat, the autonomous driving control apparatus 100 automatically changes an automatic screen off time of the mobile device 300 to a predetermined time (e.g., 15s), and changes a screen of the mobile device 300 to automatically turn off while watching a video (S202).

The autonomous driving control apparatus 100 determines whether the mobile device 300 automatically turns off (S203), and in response to the automatically turning off, determines that the driver state is unavailable (S204).

On the other hand, in response to a case where the mobile device 300 does not automatically turn off, this is because the driver continues to operate the mobile device 300, and thus the autonomous driving control apparatus 100 determines that the driver state is available and continues to periodically determine driver availability.

As illustrated in FIG. 4 and FIG. 5, according to the present disclosure, to determine the driver state, a driver state determination logic may be started after determining whether the mobile device 300 connected to the vehicle is the mobile device of the driver. In addition or alternative, the driver state may be determined to be available in response to a case where at least one of the conditions for determining the driver state in steps S102, S103, and S104 of FIGS. 4 and S203 of FIG. 5 is satisfied, or a case where a combination of two or more conditions is satisfied.

Referring to FIG. 6, the autonomous driving control apparatus 100 determines driver availability through an in-vehicle camera in response to a case where a conditional autonomous driving mode starts (S301).

The autonomous driving control apparatus 100 continues the conditional autonomous driving mode in response to a case where the driver state is available as a result of the driver availability is determined through the in-vehicle camera.

On the other hand, the autonomous driving control apparatus 100 determines whether the mobile device 300 is in a communication-connected state with the vehicle in response to a case where the driver state is unavailable as the result of the driver availability is determined through the in-vehicle camera (S302). That is, the autonomous driving control apparatus 100 may determine whether the mobile device 300 is connected to the communication device 110 of the autonomous driving control apparatus 100 through Bluetooth communication.

In response to a case where the mobile device 300 is not in the communication-connected state with the vehicle, the autonomous driving control apparatus 100 proceeds with a TD procedure for performing the TD to the driver since the driver state is unavailable (S305). Subsequently, the autonomous driving control apparatus 100 notifies that the TD is performed through a cluster (not illustrated), a multimedia system (not illustrated), and the like (S306).

On the other hand, in response to a case where the mobile device 300 is in a communication-connected state with the vehicle, the autonomous driving control apparatus 100 determines whether the connected mobile device 300 is the mobile device 300 owned, handled, or used by the driver (S303). In this case, the autonomous driving control apparatus 100 may determine whether the mobile device 300 belongs to the driver based on information exchanged with the mobile device 300. In addition or alternative, the autonomous driving control apparatus 100 may determine whether the mobile device 300 is owned, handled, or used by the driver by determining whether the mobile device 300 is positioned around the driver seat.

In response to a case where the connected mobile device 300 is not the mobile device 300 owned, handled, or used by the driver, the autonomous driving control apparatus 100 proceeds with a TD procedure for performing the TD to the driver since the driver state is unavailable (S305). Subsequently, the autonomous driving control apparatus 100 notifies that the TD is performed through a cluster (not illustrated), a multimedia system (not illustrated), the mobile device 300, and the like (S306).

On the other hand, the autonomous driving control apparatus 100 determines the driver availability using the mobile device 300 in response to a case where the connected mobile device 300 is the mobile device 300 owned, handled, or used by the driver (S304), and continues the conditional autonomous driving mode in response to the case where the driver state is available.

In FIG. 4 to FIG. 6 described above, examples of determining whether the driver state is variable using the mobile device 300 and an indoor camera of the vehicle are respectively described, but it is possible to determine the driver state by configuring various combinations of conditions for determining the respective driver states.

That is, in response to a case where it is checked whether the mobile device 300 is positioned around the driver seat, whether the mobile device 300 is the mobile device of the driver, whether the mobile device 300 is connected to the vehicle, and the like, the autonomous driving control apparatus 100 determine the driver state by using at least one of whether or not the mobile device 300 is manipulated using a vehicle interior camera, whether pupils of the driver are checked through a front camera of the mobile device 300, whether a touch operation is performed through a touch alarm of the mobile device 300, whether the mobile device 300 is automatically turned off, or a combination thereof.

In addition or alternative, the autonomous driving control apparatus 100 may use both camera information of the mobile device 300 and information related to cameras in the vehicle to estimate a position of the mobile device 300 and determine whether it is the mobile device of the driver without checking whether the mobile device 300 is positioned around the driver seat, whether the mobile device 300 is the mobile device of the driver, whether the mobile device 300 is connected to the vehicle, and the like, and may determine whether the driver is using the mobile device 300 by using the front camera in the vehicle.

As such, according to the present technique, it is possible to increase accuracy of driver availability determination by using a mobile device as well as an in-vehicle camera to determine driver availability during conditional autonomous driving, thereby increasing driver convenience.

Figure 7:
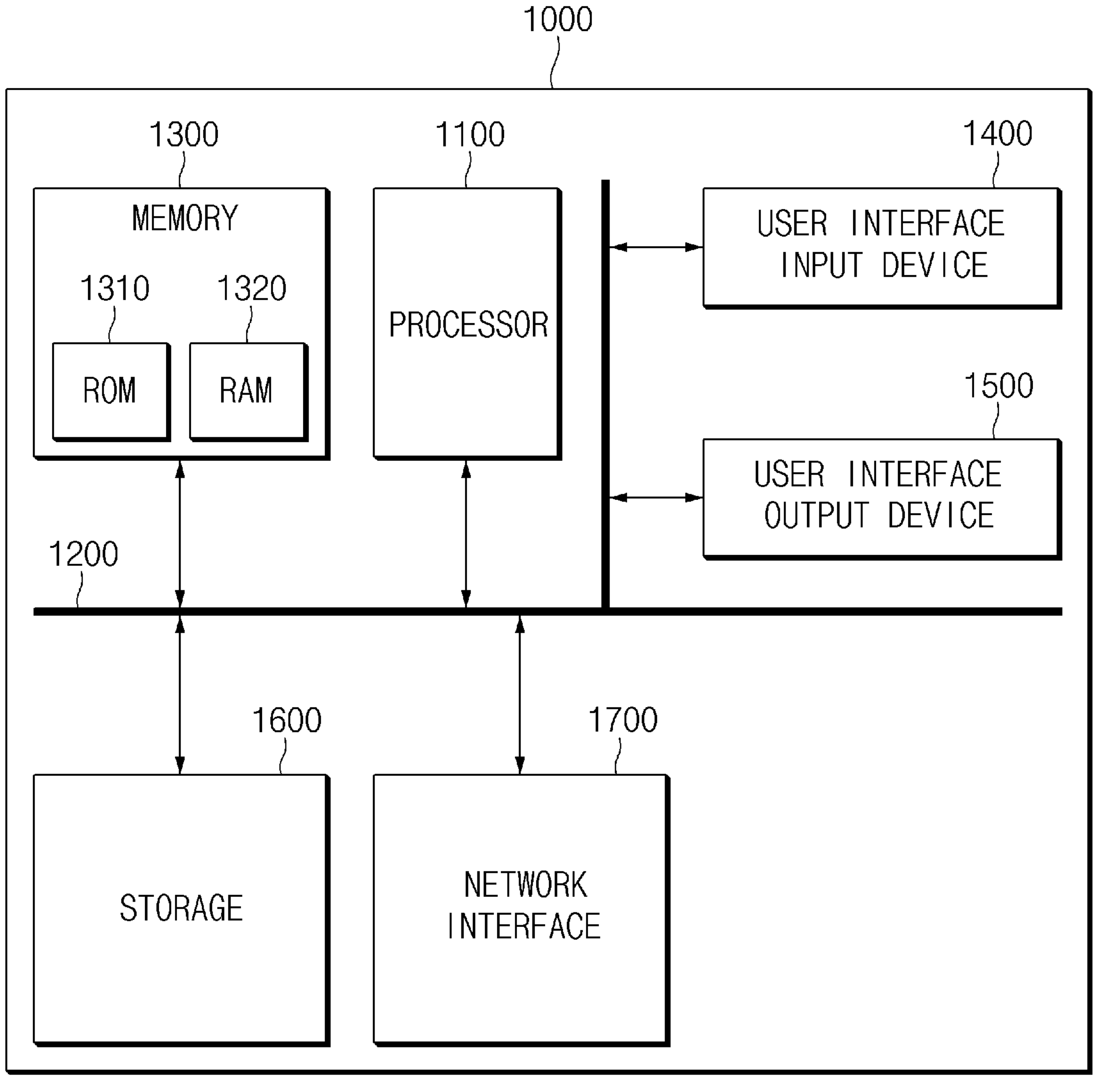
FIG. 7 shows an example computing system.

FIG. 7 shows an example computing system.

Referring to FIG. 7, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the examples disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An storage medium is coupled to the processor 1100, which can read information from and write information to the storage medium. Alternatively or additionally, the storage medium may be integrated with the processor 1100. The processor and the storage medium may reside within an application specific integrated circuit (ASIC). The ASIC may reside within a user terminal. Alternatively or additionally, the processor and the storage medium may reside as separate components within the user terminal.

An example of the present disclosure attempts to provide an autonomous driving control apparatus and a driver state determining method thereof, capable of enabling a driver to immediately act upon a transition demand by accurately monitoring a state of the driver during conditional autonomous driving.

In addition or alternative, an example of the present disclosure attempts to provide an autonomous driving control apparatus and a driver state determining method thereof, capable of accurately determining a state of a driver using a mobile device during conditional autonomous driving.

An example of the present disclosure also attempts to provide an autonomous driving control apparatus and a driver state determining method thereof, capable of accurately determining a state of a driver using a mobile device and an in-vehicle camera during conditional autonomous driving.

The technical objects of the present disclosure are not limited to the objects mentioned above, and other technical objects not mentioned may be clearly understood by those skilled in the art from the description of the claims.

An example of the present disclosure provides an autonomous driving control apparatus including: a communication device configured to communicate with a mobile device during autonomous driving; a processor configured to determine whether a driver state is a state in which a transition demand (TD) is to be received using the mobile device, and to continue the autonomous driving or perform the TD according to the driver state; and a storage configured to store data and algorithms driven by the processor.

In an example of the present disclosure, the processor may be configured to determine the driver state at a conditional autonomous driving level among autonomous driving levels.

In an example of the present disclosure, the processor may be configured to determine the driver state by using an information sensor inside a vehicle and the mobile device.

In an example of the present disclosure, the processor may be configured, in response to a case where it is determined by the information sensor inside the vehicle that the driver state is not the state in which the TD is to be received, to determine whether the mobile device is in a communication-connected state to the vehicle.

In an example of the present disclosure, the processor may be configured, in response to a case where the mobile device is in the communication-connected state to the vehicle, to determine whether the mobile device is a mobile device owned, handled, or used by a driver.

In an example of the present disclosure, the processor may be configured, in response to a case where the mobile device is positioned around a driver seat, to determine whether the mobile device is a mobile device owned, handled, or used by a driver.

In an example of the present disclosure, the processor may be configured, in response to a case where the mobile device is the mobile device owned, handled, or used by the driver, to determine the driver state using the mobile device.

In an example of the present disclosure, the processor may be configured, in response to the case where the mobile device connected to communication is not the mobile device owned, handled, or used by the driver although the mobile device is not communication-connected to the vehicle or the mobile device is communication-connected to the vehicle, to perform a transition demand (TD) procedure for receiving a TD to a driver.

In an example of the present disclosure, the processor may be configured to output a TD notification message on an in-vehicle display to inform the driver of the TD or to notify the driver of the TD through the mobile device in response to the performance of the TD procedure.

In an example of the present disclosure, the processor may be configured to continues the autonomous driving in response to a case where it is determined that the driver state is the state in which the TD is to be received.

In an example of the present disclosure, the processor may be configured to determine that the driver state is a state in which the TD is not to be received in response to a case where the mobile device is not positioned around a driver seat and the mobile device is positioned in a passenger seat or a rear seat.

In an example of the present disclosure, the processor may be configured to determine whether manipulation of the mobile device occurs at predetermined intervals, and in response to a case where the manipulation of the mobile device does not occur at predetermined intervals, to determine that the driver state is a state in which the TD is not to be received.

In an example of the present disclosure, the processor may be configured to determine whether pupils of a driver are checked through a front camera of the mobile device, and in response to a case where the pupils of the driver are not checked through the front camera of the mobile device, to determine that the driver state is a state in which the TD is not to be received.

In an example of the present disclosure, the processor may be configured to output a touch notification through the mobile device, to determine whether a touch manipulation of the mobile device is performed by a driver in response to the touch notification, and in response to a case where the touch manipulation of the mobile device is not performed by the driver according to the touch notification, to determine that the driver state is a state in which the TD is not to be received.

In an example of the present disclosure, the processor may be configured in response to a case where the mobile device is positioned around a driver seat, to set automatic screen off of the mobile device, and to determine that the driver state is a state in which the TD is not to be received in response to a case where a screen of the mobile device automatically turns off.

In an example of the present disclosure, the processor may be configured to estimate a position of the mobile device using camera information of the mobile device and information from an in-vehicle information sensor, and to determine whether the mobile device is a mobile device owned, handled, or used by a driver.

An example of the present disclosure provides a driver state determining method of an autonomous driving control apparatus, the method including: communicating, by a processor, with a mobile device during autonomous driving; determining, by the processor, whether a driver state is a state in which a transition demand (TD) is to be received using the mobile device; and continuing, by the processor, the autonomous driving or performing the TD according to the driver state.

In an example of the present disclosure, the determining of whether the driver state is the state in which the TD is to be received includes determining the driver state at a conditional autonomous driving level among autonomous driving levels.

In an example of the present disclosure, the determining of whether the driver state is the state in which the TD is to be received includes determining, by the processor, the driver state by using an information sensor inside a vehicle and the mobile device.

In an example of the present disclosure, the determining of whether the driver state is the state in which the TD is to be received includes: determining, by the processor, whether manipulation of the mobile device occurs at predetermined intervals; and determining, by the processor, that the driver state is a state in which the TD is not to be received in response to a case where the manipulation of the mobile device does not occur at predetermined intervals.

According to the present technique, it is possible to enable a driver to immediately act upon a transition demand by accurately monitoring a state of the driver during conditional autonomous driving According to the present technique, it is possible to increase driver convenience by accurately determining a state of a driver using a mobile device during conditional autonomous driving.

In addition or alternative, according to the present technique, it is possible to increase accuracy of driver availability determination by using a mobile device as well as an in-vehicle camera to determine driver availability during conditional autonomous driving.

Furthermore, various effects that can be directly or indirectly identified through this document may be provided.

The above description is merely illustrative of the technical idea of the present disclosure, and those skilled in the art to which the present disclosure pertains may make various modifications and variations without departing from the essential characteristics of the present disclosure.

Therefore, the examples disclosed in the present disclosure are not intended to limit the technical ideas of the present disclosure, but to explain them, and the scope of the technical ideas of the present disclosure is not limited by these examples. The protection range of the present disclosure should be interpreted by the claims below, and all technical ideas within the equivalent range should be interpreted as being included in the scope of the present disclosure.

What is claimed is:

1. An apparatus for controlling a driving mode of a vehicle, the apparatus comprising:
   a processor;
   memory storing instructions, when executed by the processor, cause the apparatus to:
   communicate with a mobile device during driving of the vehicle in an autonomous driving mode, wherein the mobile device is not a part of the vehicle and is located in a cabin of the vehicle;
   during the driving of the vehicle in the autonomous driving mode, initiate a process of monitoring whether a driver state of a driver of the vehicle is an available state for a manual driving mode;
   output a touch notification through the mobile device to verify the driver state of the driver of the vehicle;
   determine, based on at least one of a position of the mobile device or whether the mobile device is manipulated based on the touch notification output through the mobile device, whether the driver state is an available state for the manual driving mode; and
   based on the determination, cause the vehicle to remain in the autonomous driving mode or cause the mobile device to send a transition demand (TD) to switch the driving mode of the vehicle from the autonomous driving mode to the manual driving mode.

2. The apparatus of claim 1, wherein the instructions, when executed by the processor, further cause the apparatus to determine the driver state at a conditional autonomous driving level among a plurality of autonomous driving levels.

3. The apparatus of claim 1, wherein the instructions, when executed by the processor, further cause the apparatus to determine the driver state by using an information sensor inside the vehicle and the mobile device, and wherein the driver state is determined by using sensor information, of the information sensor, from inside the vehicle and information from the mobile device.

4. The apparatus of claim 3, wherein the instructions, when executed by the processor, further cause the apparatus to determine, based on a determination by the information sensor inside the vehicle that the driver state is not the available state, whether the mobile device is in a communication-connected state to the vehicle.

5. The apparatus of claim 4, further comprising:
   a wireless communication interface configured to communicate with the mobile device via wireless communication,
   wherein the instructions, when executed by the processor, further cause the apparatus to determine, based on a determination that the mobile device is in the communication-connected state to the vehicle via a wireless communication connection, whether the mobile device is a mobile device owned by the driver of the vehicle.

6. The apparatus of claim 5, wherein the instructions, when executed by the processor, further cause the apparatus to:
   determine whether the mobile device is positioned within a threshold distance from a driver seat by performing at least one of Bluetooth communication or ultra-wide-band (UWB) communication with the mobile device; and determine, based on the mobile device being positioned within the threshold distance from the driver seat, that the mobile device is a mobile device owned by the driver.

7. The apparatus of claim 5, wherein the instructions, when executed by the processor, further cause the apparatus to determine, based on the mobile device being the mobile device owned by the driver, the driver state using the mobile device.

8. The apparatus of claim 2, wherein the instructions, when executed by the processor, further cause the apparatus to perform, based on a determination that the mobile device is communication-connected to the vehicle and the mobile device is not owned by the driver of the vehicle, or based on a determination that the mobile device is not communication-connected to the vehicle, a TD procedure for notifying the driver of the TD.

9. The apparatus of claim 8, wherein the instructions, when executed by the processor, further cause the apparatus to:

output a TD notification message on an in-vehicle display; or notify the driver of the TD through the mobile device based on the performance of the TD procedure.

10. The apparatus of claim 1, wherein the instructions, when executed by the processor, further cause the apparatus to cause, based on a determination that the driver state is the available state, the vehicle to operate in the manual driving mode.

11. The apparatus of claim 1, wherein the instructions, when executed by the processor, further cause the apparatus to determine that the driver state is an unavailable state in which the TD is not to be sent based on a determination that the mobile device is not positioned proximate to a driver seat or the mobile device is positioned in a passenger seat or a rear seat.

12. The apparatus of claim 1, wherein the instructions, when executed by the processor, further cause the apparatus to:

determine whether manipulation of the mobile device occurs at predetermined intervals; and based on a determination that the manipulation of the mobile device does not occur at the predetermined intervals, determine that the driver state is an unavailable state in which the TD is not to be sent.

13. The apparatus of claim 1, wherein the instructions, when executed by the processor, further cause the apparatus to:

determine whether pupils of the driver are detected via a front camera of the mobile device; and based on a determination that the pupils of the driver are not detected via the front camera of the mobile device, determine that the driver state is an unavailable state in which the TD is not to be sent.

14. The apparatus of claim 1, wherein the instructions, when executed by the processor, cause the apparatus to:

based on a determination that a touch manipulation of the mobile device is not performed by the driver in response to the output touch notification, determine that the driver state is an unavailable state in which the TD is not to be sent.

15. The apparatus of claim 1, wherein the instructions, when executed by the processor, further cause the apparatus to, based on a determination that the mobile device is positioned within a threshold distance from a driver seat:

set automatic screen off mode for the mobile device by causing the mobile device to automatically change an automatic screen off time of the mobile device to a predetermined time; and determine, based on a screen of the mobile device automatically being turned off, that the driver state is an unavailable state in which the TD is not to be sent.

16. The apparatus of claim 1, wherein the instructions, when executed by the processor, further cause the apparatus to:

estimate the position of the mobile device using camera information of the mobile device and information from an in-vehicle information sensor; and determine, based on the estimated position, whether the mobile device is a mobile device owned by the driver.

17. A method for controlling a driving mode of a vehicle, the method comprising:

communicating, by a processor of the vehicle via a communication interface of the vehicle, with a mobile device during driving of the vehicle in an autonomous driving mode, wherein the mobile device is not a part of the vehicle and is located in a cabin of the vehicle;

causing the mobile device to output a touch notification to verify a driver state of a driver of the vehicle;

determining, by the processor, based on whether the mobile device is manipulated in response to the touch notification output through the mobile device, whether the driver state is an available state for a manual driving mode; and based on the determining, causing the vehicle to remain in the autonomous driving mode or causing the mobile device to send a transition demand (TD) to switch the driving mode of the vehicle from the autonomous driving mode to the manual driving mode.

18. The method of claim 17, wherein the determining whether the driver state is the available state comprises:

determining, by the processor, the driver state at a conditional autonomous driving level among a plurality of autonomous driving levels; and determining, by the processor using an information sensor inside the vehicle and the mobile device, the driver state, wherein the driver state is determined by using sensor information, of the information sensor, from inside the vehicle and information from the mobile device.

19. The method of claim 17, wherein the determining whether the driver state is the available state comprises:

determining, by the processor, whether manipulation of the mobile device occurs at predetermined intervals; and determining, by the processor and based on a determination that the manipulation of the mobile device does not occur at the predetermined intervals, that the driver state is an unavailable state in which the TD is not to be sent.

20. A vehicle comprising:

a processor;

memory storing instructions, when executed by the processor, cause the vehicle to:

communicate with a mobile device via a wireless communication interface during autonomous driving of the vehicle, wherein the mobile device is not a part of the vehicle and is located in a cabin of the vehicle;

cause, via the wireless communication interface, the mobile device to output a notification for assessing a driver state of a driver of the vehicle;

determine, based on at least one of a position of the mobile device or whether the mobile device is manipulated based on the notification output through the mobile device, whether the driver state of the driver of the vehicle is an available state for a manual driving mode of the vehicle; and based on the determination, cause the vehicle to remain in an autonomous driving mode or cause the mobile device to send a transition demand (TD) to switch a driving mode of the vehicle from the autonomous driving mode to the manual driving mode.

* * * * *